(12) United States Patent
Hanley et al.

(10) Patent No.: US 6,195,981 B1
(45) Date of Patent: Mar. 6, 2001

(54) VECTORING NOZZLE CONTROL SYSTEM

(75) Inventors: Charles F. Hanley, Liberty Township; David J. Markstein, Cincinnati, both of OH (US)

(73) Assignee: General Electric Company, Cincinnati, OH (US)

(*) Notice: Subject to any disclaimer, the term of this patent is extended or adjusted under 35 U.S.C. 154(b) by 0 days.

(21) Appl. No.: 09/120,354

(22) Filed: Jul. 22, 1998

(51) Int. Cl.$^7$ .................................................. F02K 1/00
(52) U.S. Cl. ........................ 60/204; 60/232; 239/265.35
(58) Field of Search ........................... 60/204, 271, 228, 60/232; 239/265.19, 265.35

(56) References Cited

U.S. PATENT DOCUMENTS

| | | | |
|---|---|---|---|
| 4,994,660 | 2/1991 | Hauer | 239/265.41 |
| 5,076,496 | 12/1991 | Lippmeier | 239/239.41 |
| 5,150,839 | 9/1992 | Reedy | 239/265.41 |
| 5,174,502 | 12/1992 | Lippmeier et al. | 239/265.41 |
| 5,261,605 | 11/1993 | McLafferty et al. | 239/265.35 |
| 5,267,436 | 12/1993 | Wood, Jr. et al. | 60/204 |
| 5,269,467 | 12/1993 | Williams et al. | 239/265.41 |
| 5,351,888 | 10/1994 | Taylor et al. | 239/127.3 |
| 5,379,585 | 1/1995 | Snow et al. | 60/204 |
| 5,437,411 | 8/1995 | Renggli | 239/265.39 |
| 5,442,909 | 8/1995 | Snow et al. | 60/204 |
| 5,484,105 | 1/1996 | Avsdenmoore et al. | 239/127.3 |
| 5,485,959 | 1/1996 | Wood et al. | 239/265.41 |
| 5,553,452 | 9/1996 | Snow et al. | 60/327 |
| 5,685,141 | 11/1997 | Markstein et al. | 60/204 |
| 5,779,152 | * | 7/1998 | Renggli et al. | 239/265.33 |

FOREIGN PATENT DOCUMENTS

| | | |
|---|---|---|
| 0544764 B1 | 11/1995 | (EP) . |
| 0704615 A2 | 4/1996 | (EP) . |
| 0723075 A2 | 9/1996 | (EP) . |

* cited by examiner

*Primary Examiner*—Charles G. Freay
(74) *Attorney, Agent, or Firm*—Andrew C. Hess; Rodney M. Young (57) ABSTRACT

A method controls the stroke of three circumferentially spaced apart actuators attached at respective joints to an actuation ring positionable to vector thrust in a gas turbine engine exhaust nozzle. The circumferential angular location of each of the actuator joints is specified. And, the stroke for each of the actuators is independently calculated using the joint locations in response to pitch and yaw commands. The actuators are then operated to effect the respective strokes therefor to position the nozzle. In a preferred embodiment, the angular locations are specified once, and trigonometric functions thereof are calculated and stored in memory. The stored values may then be used subsequently in calculating stroke as the pitch and yaw commands change.

22 Claims, 4 Drawing Sheets

VECTORING NOZZLE CONTROL SYSTEM

BACKGROUND OF THE INVENTION

The present invention relates generally to aircraft gas turbine engines, and, more specifically, to vectoring exhaust nozzles therefor.

A typical high performance, augmented gas turbine engine includes a varying area converging-diverging exhaust nozzle which is axisymmetric about a longitudinal or axial centerline axis. The nozzle includes a plurality of circumferentially adjoining primary exhaust flaps joined in turn to a plurality of circumferentially adjoining secondary exhaust flaps. The secondary flaps are joined by corresponding outer compression links to a common stationary casing also supporting the primary flaps.

This assembly is articulated in the manner of four-bar linkages to vary exhaust flow area, designated A8, at the nozzle throat between the primary and secondary flaps, and for varying the flow area of the nozzle outlet, designated A9, at the downstream end of the secondary flaps. Suitable linear actuators such as hydraulic actuators are circumferentially spaced apart around the casing and have respective output rods joined to the nozzle for pivoting the primary flaps to control the throat area and in turn control the outlet-to-throat area ratio.

In order to increase the maneuverability of aircraft powered by augmented gas turbine engines, vectoring exhaust nozzles are being developed. In U.S. Pat. No. 4,994,660, assigned to the present assignee, an Axisymmetric Vectoring Exhaust Nozzle (AVEN®) is disclosed. In this type of nozzle, a primary actuation ring surrounds corresponding cams on the outboard surfaces of the primary flaps and is operatively joined to a plurality of primary linear actuators which control its axial position perpendicular to the axial centerline axis of the nozzle. The outer links in this nozzle are joined to a secondary actuation ring which in turn is joined to a plurality of secondary linear actuators mounted to the casing.

During operation, axial translation or slide of the primary ring controls the pivoting of the primary flaps and in turn the nozzle throat area. The secondary ring may also slide axially to independently control pivoting of the secondary flaps and in turn control both the outlet area and the area ratio. Furthermore, the secondary ring may be tilted in space to effect pitch or yaw, or both, in the secondary flaps to effect nozzle vectoring in which the engine exhaust is discharged at a slight angle from the engine centerline axis as opposed to coaxially therewith as in conventional non-vectoring exhaust nozzles.

Since the secondary flaps are vectorable they substantially increase the complexity of the nozzle design and its implementation. For this reason, many additional patents have been granted on various features of the AVEN® exhaust nozzle in behalf of the present assignee. These patents relate to both the mechanical details of the nozzle and the control systems therefor.

Since a plurality of circumferentially adjoining secondary flaps are utilized in the nozzle, suitable inter-flap seals must also be provided for preventing flow leakage between the flaps as the flaps are positioned through a suitable range of vectoring. This range, however, is limited to avoid inter-flap flow leakage or undesirable distortion of the various components.

Furthermore, the control system for the vectorable nozzle is being developed for a digitally programmable controller to process the required data in real time and control the actuators in feedback closed loops. The nozzle controller typically includes limiting values to prevent excess vectoring of the nozzle within the mechanical capabilities of the nozzle components. And, the nozzle controller must be sufficiently fast to process the required data in real time for the extremely fast maneuvering of the nozzle and the aircraft being powered therewith.

In order to obtain sufficient real time processing capability of the vectorable exhaust nozzle, the secondary actuators have been equiangularly spaced apart from each other symmetrically about the vertical and horizontal axes. Nozzle yaw is defined by the angular rotation of the secondary flaps about the vertical axis. And, nozzle pitch is defined by the angular rotation of the secondary flaps around the horizontal axis, which is perpendicular to the vertical axis. Combinations of pitch and yaw are also possible for providing full 360° vectoring capability of the nozzle.

The symmetrical orientation of the secondary actuators significantly simplifies the control algorithms for converting pitch and yaw commands into the required movement of the secondary actuation ring for in turn positioning the secondary flaps. In one simple control scheme, actuators above and below the horizontal axis are driven in proportional magnitude both forward and aft to effect nozzle pitch. Similarly, the actuators may be driven symmetrically on opposite sides of the vertical axis both forward and aft to effect nozzle yaw.

In view of the fixed, predetermined, and symmetrical relationship of the actuators on the secondary actuation ring, simple trigonometric relationships for determining actuator stroke to effect pitch and yaw were previously developed. This greatly simplifies the control algorithms and allows the use of known trigonometric functions for specific angles associated with the actuators. The fixed trigonometric functions may therefore be represented in the control algorithms by the numerical values thereof, between zero and one, and suitably stored in memory for subsequent use.

However, since the exhaust nozzle must be mounted in corresponding engine bays in various types of aircraft, space limitations may prevent the symmetrical mounting of the secondary actuators, and the attendant simplification of control algorithms. If the actuators are not symmetrically attached to the secondary actuation ring, or if the attachment changes from design to design, the simple control algorithms will be ineffective in controlling vector operation.

Furthermore, more than three actuators may be used for the secondary actuation ring which requires precise control of the fourth or more actuators to prevent opposition with the initial three actuators which define the plane of the secondary ring. In some designs, it may be desirable to employ two redundant secondary actuator systems, with each system having three actuators. The six actuators must therefore be controlled in unison to prevent opposition load therebetween and to ensure that all the actuators operate synchronously. Two redundant systems reduce the likelihood of symmetrical orientation of all of the actuators and a resulting simplified control system therefor.

Accordingly, it is desired to provide a generic control system for the vectoring actuators in an exhaust nozzle which is operable regardless of the circumferential location of the individual actuators, yet, at the same time, reduces the complexity of the required control algorithms therefor, and reduces the need for repetitive calculations which would otherwise increase processing time, which is limited in real-time control of the exhaust nozzle.

SUMMARY OF THE INVENTION

A method controls the stroke of three circumferentially spaced apart actuators attached at respective joints to an actuation ring positionable to vector thrust in a gas turbine engine exhaust nozzle. The circumferential angular location of each of the actuator joints is specified. And, the stroke for each of the actuators is independently calculated using the joint locations in response to pitch and yaw commands. The actuators are then operated to effect the respective strokes therefor to position the nozzle. In a preferred embodiment, the angular locations are specified once, and trigonometric functions thereof are calculated and stored in memory. The stored values may then be used subsequently in calculating stroke as the pitch and yaw commands change.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
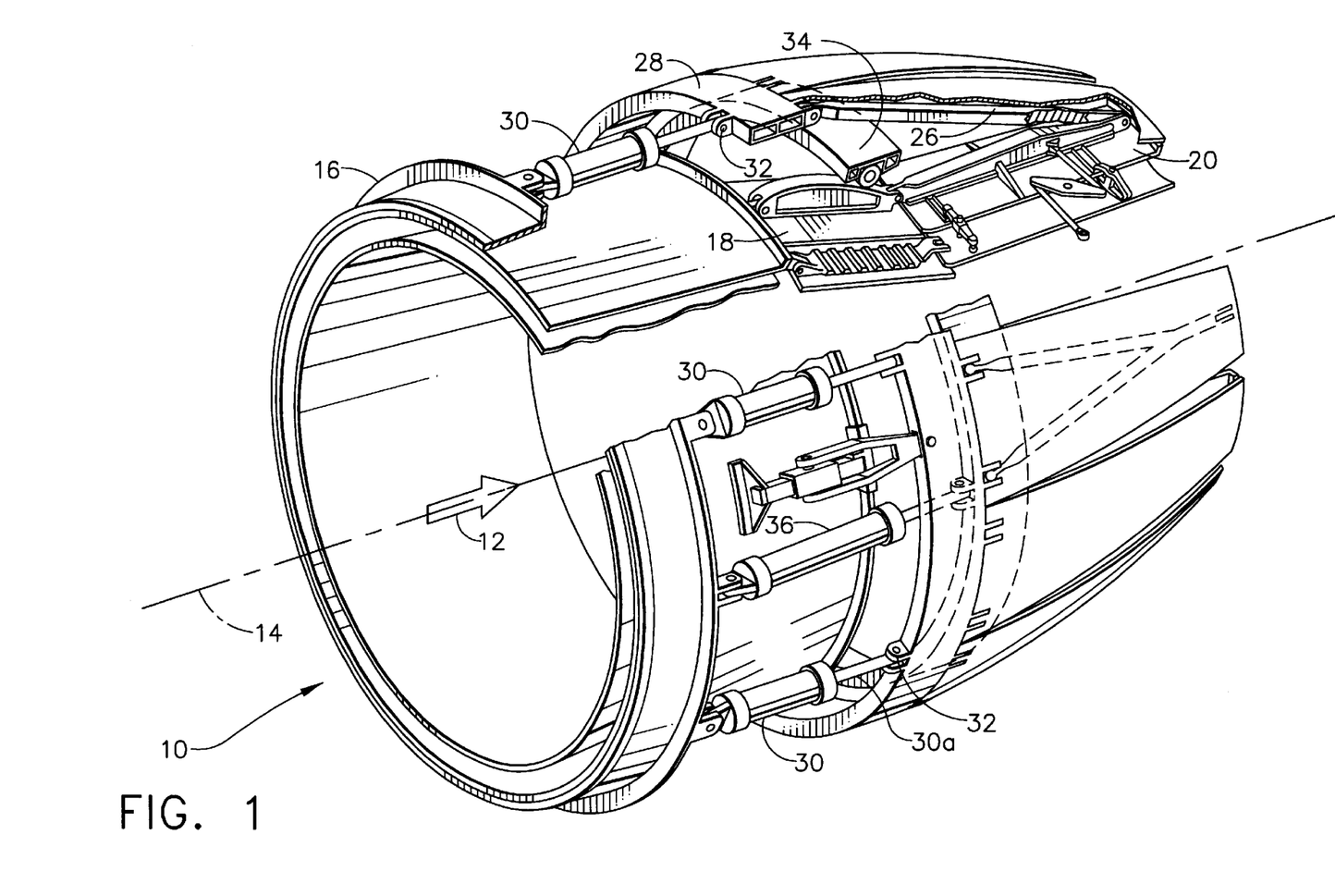
FIG. 1 is an isometric, partly sectional view of a gas turbine engine axisymmetric vectoring exhaust nozzle in accordance with an exemplary embodiment of the present invention.
Figure 2:
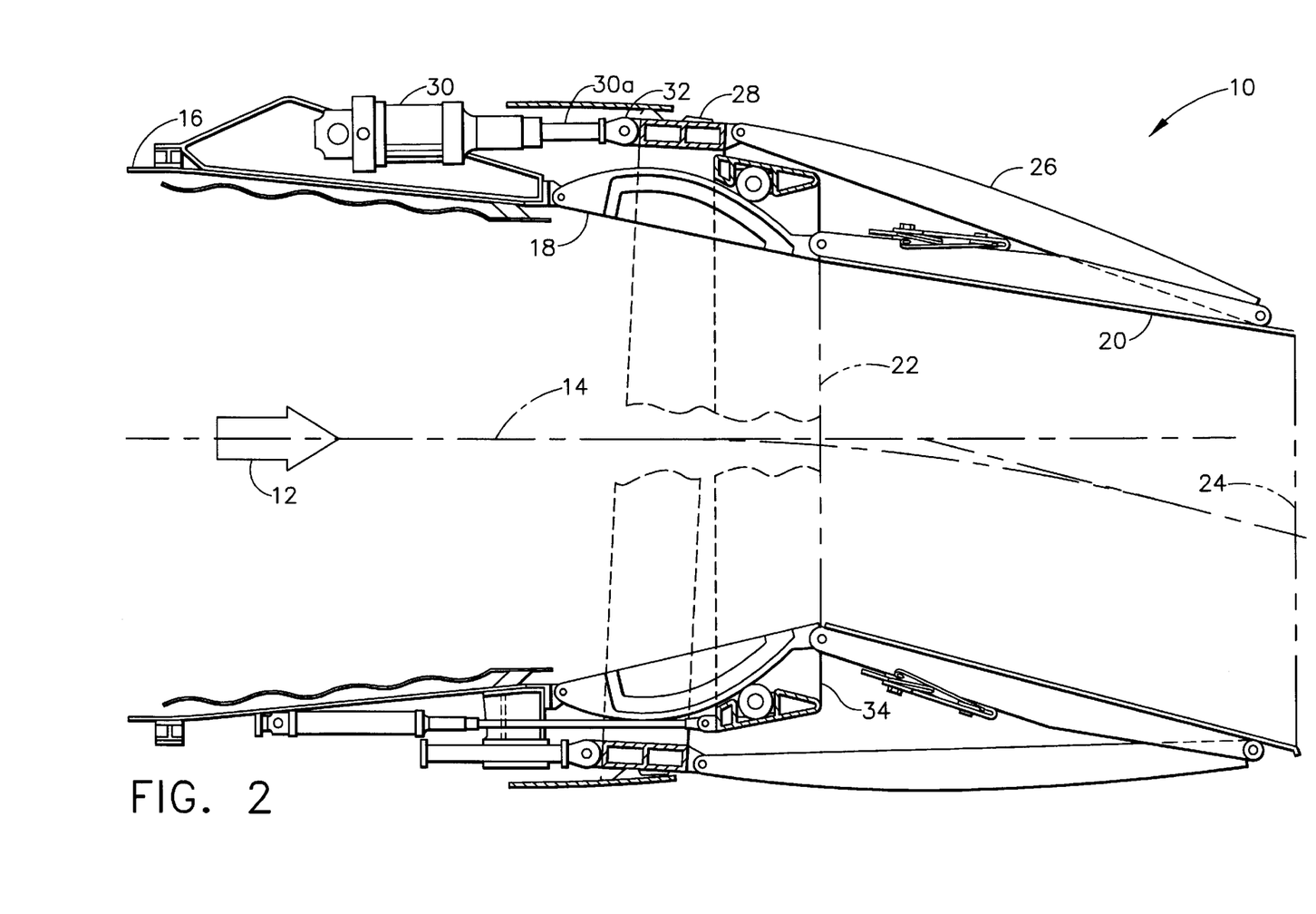
FIG. 2 is an elevational partly sectional view of the exhaust nozzle illustrated in FIG. 1 showing one of several secondary actuators joined to a secondary actuation ring for vectoring the exhaust nozzle.

Illustrated in FIGS. 1 and 2 is an exemplary axisymmetric vectoring exhaust nozzle 10 which receives combustion exhaust gases 12 from an augmented, turbofan gas turbine engine (not shown) to produce thrust for powering an aircraft (not shown) in flight. The nozzle 10 is axisymmetric about a longitudinal or axial centerline axis 14 and includes a fixed or stationary annular casing 16 which is suitably fixedly joined to the exhaust duct (not shown) of the gas turbine engine for receiving the exhaust 12 therefrom.

As best seen in FIG. 2, the nozzle 10 includes a plurality of circumferentially adjoining primary exhaust flaps 18 pivotally joined at forward ends thereof to the casing 16. A plurality of circumferentially adjoining secondary exhaust flaps 20 are pivotally joined at their forward ends to the aft ends of the primary flaps 18 and define a throat 22 of minimum flow area, designated A8. The aft or downstream ends of the secondary flaps 20 define a nozzle outlet 24 having a flow area designated A9.

The aft ends of the secondary flaps 20 are pivotally joined to respective circumferentially spaced apart outer compression links 26 having forward ends pivotally joined to a common secondary actuation ring 28. At least three circumferentially spaced apart secondary actuators 30 are pivotally attached at respective joints 32 to the common secondary ring 28. The secondary actuators 30 are linear actuators, such as hydraulic actuators, having respective output rods 30a which may be selectively extended or retracted for correspondingly translating the secondary ring 28 at the respective joints 32.

Since the secondary flaps 20 are joined at their aft ends to the corresponding outer links 26 which in turn are joined to the secondary ring 28, translation of the secondary ring 28 may be used to control the flow area A9 of the outlet 24 and the corresponding outlet-to-throat area ratio A9/A8.

To control the flow area A8 of the throat 22, each of the primary flaps 18 has a corresponding cam on its outboard side that engages corresponding rollers mounted in a primary actuation ring 34 which surrounds the primary flaps 18. As shown in FIG. 1, a plurality of primary actuators 36, three for example, are pivotally joined at their forward ends to the casing 16, and have corresponding output rods pivotally joined to the primary ring 34.

Since the primary flaps 18 are pivotally joined at their forward ends to the casing 16, the pressure of the exhaust 12 during operation urges the primary flaps radially outwardly to engage the primary ring 34 which controls the size of the throat 22. By axially translating the primary ring 34 in the forward or aft direction, the cam profile on the backsides of the primary flaps 34 control the pivoting movement of the flaps and the corresponding area of the throat 22.

In this way, the primary and secondary flaps are independently controllable by their respective actuators and rings for controlling areas of the throat 22 and outlet 24, and the area ratio A9/A8 thereof. Furthermore, by also tilting the secondary ring 28, the secondary flaps 20 may be skewed or vectored relative to the centerline axis 14 for effecting thrust vectoring.

The above described exhaust nozzle 10 is generally conventional in configuration, except for the circumferential locations of the secondary actuators 30 which drive the secondary ring 28 and the control system therefor. Additional details of this nozzle may be found in U.S. Pat. No. 4,994,660 as introduced above in the Background section.

In accordance with the present invention, an improved method for controlling the output stroke of the three circumferentially spaced apart secondary actuators 30 permits operation of the nozzle regardless of the circumferential location of the individual secondary actuators 30. The secondary actuators 30 need not be symmetrically attached to the casing 16 and secondary ring 28 as in the previous embodiment described above but may have any circumferential location around the secondary ring 28, which is represented schematically in FIG. 3.

Figure 3:
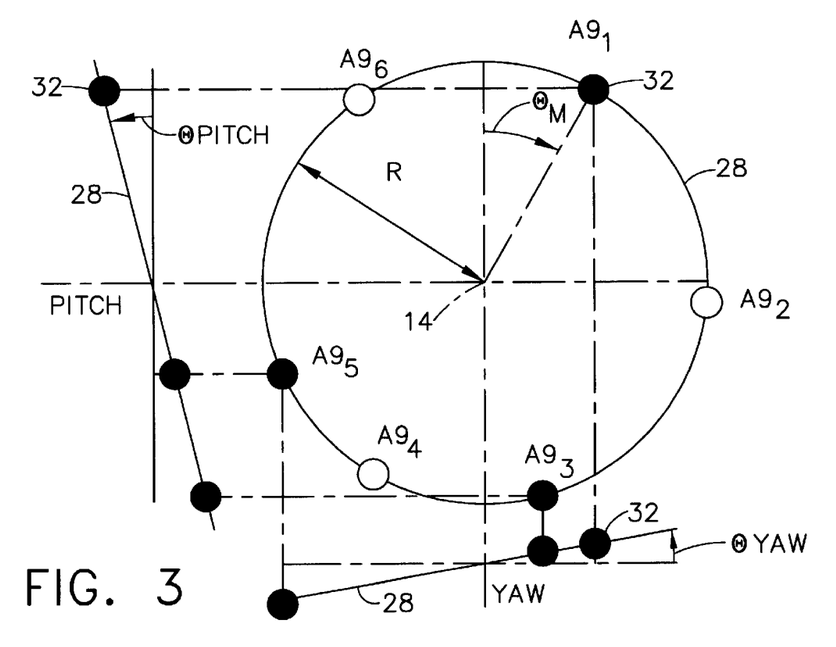
FIG. 3 is a schematic representation of two redundant three-actuator driving systems joined to the secondary actuation ring illustrated in FIGS. 1 and 2 for positioning thereof.

FIG. 3 illustrates schematically a vertical plane view of the circular secondary ring 28 with the circumferential angular position or location designated $\theta_M$ for each of the respective joints 32 of the corresponding secondary actuators 30 which drive the ring 28. The joints 32 are at a common ring radius R from the centerline axis 14. The angular location is relative to the vertical centerline plane at 12:00 O'clock for example; and the letter "M" is an index for each actuator.

Three of the joints 32 are represented by solid circles in one hydraulic system having three actuators 30 for driving the secondary ring 28 at three locations defining a common plane. Three additional joints 32 for corresponding secondary actuators 30 in a second, redundant hydraulic system are also illustrated in hollow circles for independently driving the secondary ring 28 at three points in a common plane. The two hydraulic systems are coordinated in accordance with the present invention to ensure that all six actuators are synchronously operated for driving the secondary ring 28 in a common plane regardless of the tilt thereof without undesirable differential forces on the ring 28 which would effect distortion stress therein.

In accordance with one feature of the invention as illustrated in FIG. 3, the several actuators corresponding with their respective joints on secondary ring 28 may be positioned at any suitable circumferential angular location $\theta_M$ around the ring 28, and without equal circumferential spacing therebetween in order to increase the versatility of the exhaust nozzle for being mounted in various engine bays of various aircraft. In this arrangement, the required strokes for the respective secondary actuators do not enjoy the previous benefit of symmetry for effecting tilt of the secondary ring 28 resulting in pitch and yaw thereof.

The left portion of FIG. 3 is representative of a vertical side or pitch-plane view of the secondary ring 28 showing pitch of the ring at a corresponding pitch angle $\theta_{PIT}$, where PIT is short for Pitch. Ring pitch may be effected by tilting the ring 28 either forward or aft along the centerline axis 14, with the corresponding axial translation of each of the actuator joints 32 being most likely different in magnitude.

The bottom portion of FIG. 3 is a horizontal top or yaw-plane view of the secondary ring 28 tilted under a yaw angle $\theta_{YAW}$. The secondary ring 28 remains coplanar and is tilted in the horizontal plane both forwardly and aftly about the centerline axis 14 to effect yaw. The axial translation of the respective actuator joints 32 for effecting yaw typically have different magnitudes.

The six actuator joints 32 illustrated in FIG. 3 are additionally designated with respect to the required axial stroke thereof, $A9_1$, $A9_2$, . . . $A9_6$, for effecting the required movement of the secondary ring 28. The actuators are identified sequentially starting with the first actuator near the 1:00 (O'clock) position in FIG. 3 increasing sequentially clockwise to the sixth actuator near the 11:00 position (aft looking forward). The first, third, and fifth actuators are configured in a common first hydraulic system operated for driving the secondary ring 28 with axial translation or slide, pitch, or yaw, or any combination thereof.

The second, fourth, and sixth actuators are disposed in a second hydraulic system which is redundant to the first hydraulic system and has the same functional capability. In view of the three or more actuators joined to the common secondary ring 28 regardless of the circumferential location of each of the actuators, a suitable control system 38 is required for the operation thereof as shown schematically in FIG. 4 for practicing an improved control method illustrated in flowchart form in FIG. 5 in accordance with an exemplary embodiment of the present invention.

Figure 4:
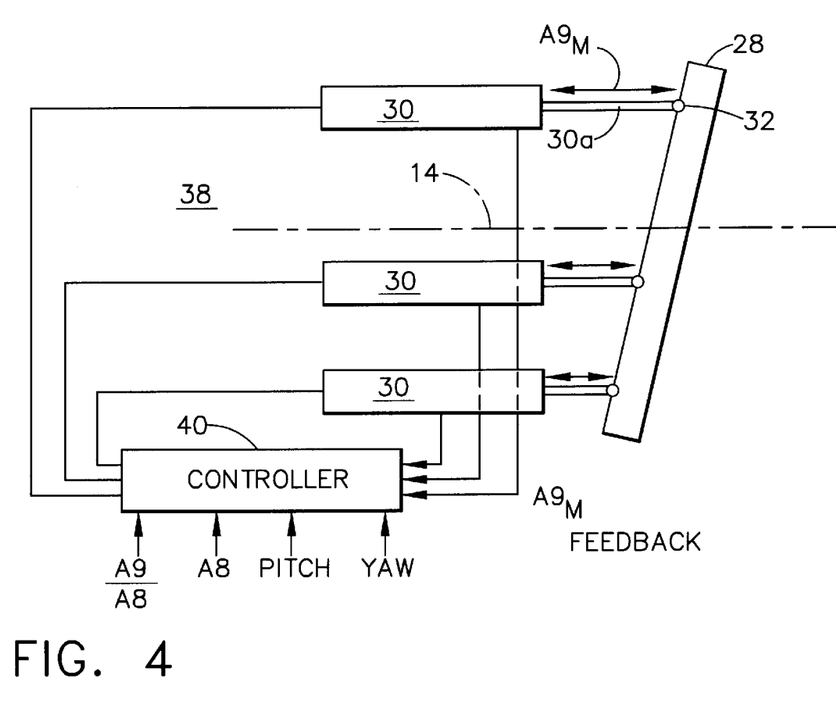
FIG. 4 is a schematic representation of one of the three-actuator driving systems illustrated in FIG. 1 attached to the secondary actuation ring at respective circumferential angular positions, and a control system therefor for driving the three actuators in feedback closed loops.

FIG. 4 illustrates schematically three of the secondary actuators 30 joined to the secondary ring 28 at the respective joints 32 in a feedback closed loop configuration for driving the secondary ring 28, and in turn positioning the secondary flaps 20 (see FIGS. 1 and 2) for controlling thrust vectoring. The three actuators 30 illustrated in FIG. 4 are representative of both the first group for effecting the corresponding axial strokes $A9_1$, $A9_3$, and $A9_5$, as well as the second group for effecting the corresponding axial strokes $A9_2$, $A9_4$, and $A9_6$.

Means in the exemplary form of a nozzle controller 40 are operatively joined to the several secondary actuators 30, as well as the primary actuators 36, in feedback loops for controlling operation thereof. The controller 40 may have any conventional form such as a digitally programmable computer in the form of a Vector Electronic Control (VEC) computer which is suitably programmed with control algorithms for dynamic control of the exhaust nozzle.

In accordance with one feature of the present invention, the controller 40 is configured for independently calculating the required stroke $A9_M$ for each of the secondary actuators 30 using the angular joint locations $\theta_M$ in response to pitch and yaw commands of the secondary ring 28. Although the controller 40 also controls operation of the primary actuators 36, this may be done in any conventional manner since the primary ring 34 is simply axially translated without tilt for controlling the throat area A8.

The basic control parameters of the exhaust nozzle 10 include the throat area A8 and a corresponding outlet to throat area ratio A9/A8. These commands may be conventionally provided to the nozzle controller 40 as required for proper operation of the engine for powering the aircraft. Since the nozzle 10 is vectorable, two additional control parameters or commands are required and include, for example, the desired pitch and yaw of the secondary actuation ring 28 for vectoring the exhaust from the nozzle in a suitable vector angle obliquely from the centerline axis of the nozzle.

Accordingly, the required movement of the secondary ring 28 includes three components: one for pure axial translation or slide wherein all actuators produce identical strokes for translating the secondary ring 28 in equal amounts along the centerline axis 14; pitch represented in the left portion of FIG. 3 in which the secondary ring 28 is tilted forward and aft in the vertical pitch plane about the centerline axis; and yaw illustrated in the bottom of FIG. 3 wherein the secondary ring 28 is tilted forward and aft in the horizontal yaw plane about the centerline axis 14. A basic actuator stroke equation for these three components is represented by:

$$A9_M = A9_{SLIDE} + (R \times Cos\theta_M) \times Sin\theta_{PIT} + (R \times Sin\theta_M) \times Sin\theta_{YAW} \quad (1)$$

The letter "M" is the index for the corresponding secondary actuator 30 including 1, 3, 5 and 2, 4, 6. $A9_{SLIDE}$ is the equal axial stroke component for each of the secondary actuators for effecting a corresponding outlet area A9 and corresponding area ratio A9/A8. The pitch component of axial stroke is based on simple trigonometry in the left hand pitch plane illustrated in FIG. 3 which is the axial translation of the respective actuator joint 32 from the vertical plane corresponding with the amount of the pitch command $\theta_{PIT}$. And, the yaw component of axial stroke is also based on simple trigonometry due to the tilting of the secondary ring 28 in the yaw plane illustrated in the bottom of FIG. 3 for the amount of the yaw command $\theta_{YAW}$ at each of the actuator joints 32.

Eq. (1) is a simplification based on several assumptions. As shown in FIG. 4, the secondary actuators 30 are assumed to be parallel to the centerline axis 14. Correspondingly, the mounting of the secondary actuators 30 at both their forward ends to the casing 16 and at their aft ends to the secondary ring 28 have the same radius R as the secondary ring 28. And, the secondary ring 28 is circular and rigid.

Although differences in the geometry of the exhaust nozzle over these assumptions exist in reality, such differences are relatively small and do not significantly affect operation of the actuators and control system. Although more complex equations may be used for modeling the actuation system for obtaining more exact control thereof, they are not necessary and would substantially increase the complexity of the required nozzle controller 40 without significant benefit.

It is important to recognize that the digital controller 40 and the current state of art has practical limits in real-time computational ability. The calculation of trigonometric parameters consumes substantial time and is typically avoided where possible. For this reason, the previous development version of the control system for the AVEN® nozzle greatly simplified the actuation geometry using the symmetry described above and eliminated the need to calculate many trigonometric functions to prevent exceeding the capability of state of the art digital controllers.

As eq. (1) indicates, the stroke components for both pitch and yaw each includes the trigonometric function for the corresponding pitch and yaw angular commands, as well as the trigonometric functions based on the circumferential angular location $\theta_M$ for each of the secondary actuators 30 and the radius R of the secondary ring 28. By determining or specifying the circumferential angular location $\theta_M$ of each of the secondary actuators 30, or their respective joints 32, the required stroke $A9_M$ for each of the actuators 30 may be independently calculated in the controller 40 in response to the pitch and yaw commands at a given throat area A8. The individual secondary actuators 30 may then be operated or powered to then effect the respective stroke $A9_M$ therefor to position the secondary actuation ring 28 to vector the nozzle 10 as desired so that the exhaust 12 is discharged obliquely to the centerline axis 14.

As indicated above, the required stroke for each of the secondary actuators includes discrete components for axial slide, pitch, and yaw of the secondary ring 28 which is also based on the initial angular location $\theta_M$ of each of the secondary actuators regardless of the position or symmetry thereof. Correspondingly, the pitch and yaw components of stroke as found in eq. (1) include two trigonometric functions of both the angular locations $\theta_M$ and the pitch and yaw angles $\theta_{PIT}$ and $\theta_{YAW}$.

Although eq. (1) allows the generic definition of the actuator system regardless of the circumferential locations of the individual actuators, it is undesirable to configure the controller 40 for repeating the calculation of all the trigonometric functions to determine the required stroke in real time since this would significantly increase processing time and reduce the efficiency of the controller 40.

Accordingly, the angular locations $\theta_M$ of the actuator joints 32 need only be specified only once when the controller 40 is initially programmed for operation with one or more geometric configurations of the actuation system. The controller 40 may then be initially operated in an initialization mode for initially calculating the required trigonometric functions of the angular locations $\theta_M$ only once since they remain constant for a given actuator system.

Figure 5:
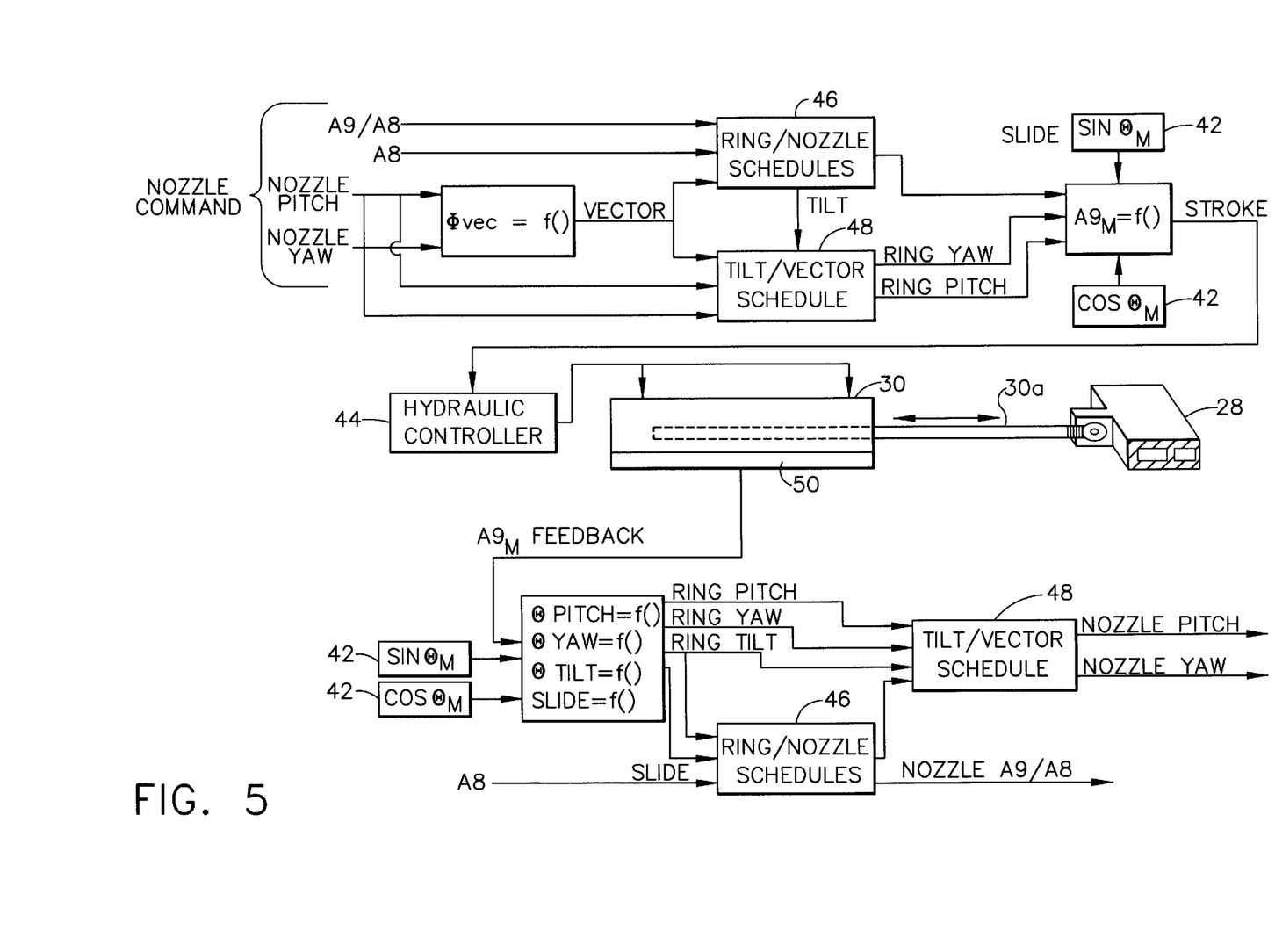
FIG. 5 is a block diagram representation of the command and feedback control loops for the control system illustrated in FIG. 4.

Associated with the controller 40 is a suitable computer memory 42, shown in FIG. 5, of any conventional form in which the calculated values of the constant trigonometric functions for the angular locations are stored for subsequent retrieval and use during real time processing in the controller 40. Accordingly, the stored trigonometric functions corresponding to the angular locations $\theta_M$ are repetitively and subsequently used in the controller 40 for calculating the stroke $A9_M$ in accordance with eq. (1) as the pitch and yaw commands change.

As shown in FIG. 5, the sine and cosine values of the angular locations $\theta_M$ and related trigonometric functions need only be calculated once and stored in the memory 42 for subsequent reuse in eq. (1) which substantially decreases the required computational time for the controller 40, while maintaining the versatility of quickly defining different actuation systems wherein the several secondary actuators 32 have different angular locations. The controller 40 may be calibrated for each nozzle design by simply inputting the corresponding angular locations for each of the actuators and then performing an initial calculation for the constant trigonometric functions based thereon which are then subsequently used in the generic stroke eq. (1).

As shown in FIG. 5, the stroke eq. (1) is calculated in real time in the controller 40 for obtaining the required stroke $A9_M$ for each of the secondary actuators 30. The calculated stroke is then transmitted to suitable means in the form of a hydraulic controller 44 operatively joined to the several secondary actuators 30 for extending and retracting the corresponding output rods thereof to effect the respective stroke therefor to position the secondary ring 28 for vectoring the nozzle 10. The hydraulic controller 44 may take any conventional form which suitably provides hydraulic fluid under pressure for selectively extending or retracting the actuator output rod as required for the calculated stroke thereof.

As indicated above in eq. (1), the stroke for each actuator is the summation of axial slide $A9_{SLIDE}$; product of the sine of the pitch command $\theta_{PIT}$ and the cosine of the joint angular location $\theta_M$ times the ring radius R; and the product of the sine of the yaw command $\theta_{YAW}$ and the sine of the joint angular location $\theta_M$ also times the ring radius R. Since the sine and cosine trigonometric functions of the respective joint angular locations $\theta_M$ are constant values for a particular actuation geometry, they may be calculated only once and stored in the memory 42 for subsequent reuse without the need for recalculation. Since the ring radius R is also a constant value, its product with the trigonometric functions of the joint angular locations may also be stored in the memory 42 for subsequent reuse.

As indicated above, three points define a single plane, and therefore preferably only three of the secondary actuators 30 cooperate in a given hydraulic system for driving the secondary ring 28. However, four or more actuators may be used as desired, with FIG. 3 illustrating a redundant actuation system including the additional three secondary actuators 30 represented by their corresponding strokes $A9_{2,4,6}$ at the hollow circles.

Since the exhaust nozzle 10 includes four or more secondary actuators 30 attached at corresponding joints 32 to the common secondary actuation ring 28 circumferentially between respective pairs of the first three actuators, additional procedures are required for coordinating or synchronizing the operation of the secondary actuators to prevent force fights between the secondary actuators joined to the common secondary ring 28. Accordingly, the circumferential angular location $\theta_M$ for the fourth, and additional, secondary actuators and their respective joints is also initially specified as an input value to the controller 40.

The stroke $A9_M$ for the fourth and additional secondary actuators 30 may then be calculated in the controller 40 in response to the same pitch and yaw commands for the ring using eq. (1). However, in the event of actuator faults, it is desirable to independently verify that the multiple actuators effect coplanar movement of the secondary ring 28. Accordingly, the stroke for the fourth secondary actuator may be calculated as a function of the measured feedback strokes for the first three secondary actuators to maintain the secondary ring 28 in a common plane as it slides and tilts under pitch and yaw, without undesirable distortion or differential forces in the four or more secondary actuators attached thereto.

The stroke for the fourth or more secondary actuators may be verified from the following equation:

$$A9_M = \frac{\begin{array}{l}A9_1 \times [\text{Sin}(\theta_M - \theta_5) + \text{Sin}(\theta_3 - \theta_M) + \text{Sin}(\theta_5 - \theta_3)] + \\ A9_3 \times [\text{Sin}(\theta_M - \theta_1) + \text{Sin}(\theta_5 - \theta_M) + \text{Sin}(\theta_1 - \theta_5)] + \\ A9_5 \times [\text{Sin}(\theta_M - \theta_3) + \text{Sin}(\theta_1 - \theta_M) + \text{Sin}(\theta_3 - \theta_1)]\end{array}}{\text{Sin}(\theta_5 - \theta_3) + \text{Sin}(\theta_1 - \theta_5) + \text{Sin}(\theta_3 - \theta_1)} \quad (2)$$

The stroke $A9_M$ for all the secondary actuators is initially calculated in the controller 40 in accordance with eq. (1). The controller then calculates the corresponding strokes $A9_{2,4,6}$ in accordance with eq. (2) to verify that the redundant three secondary actuators effect coplanar movement with the first three secondary actuators based on the respective circumferential angular locations $\theta_M$ thereof. In eq. (2), the fourth actuator stroke is a function of the angular differences between each of the four joint angular locations $\theta_{1,3,5,M}$ and each other.

The fourth secondary actuator represented in eq. (2) may be any one of the three secondary actuators in the redundant system, or could alternatively be a fourth actuator in the same secondary actuation system. Since more than three actuators are used, the fourth, or more, actuators on the common secondary ring 28 must satisfy eq. (2) for obtaining common plane movement of the secondary ring without distortion or undesirable force fight irrespective of the initial circumferential location of the individual secondary actuators.

Eq. (2) includes trigonometric functions for the several angular differences, and since the angular differences are constant for a given actuation system, the trigonometric functions for the angular differences may be calculated once in the controller 40 and stored in the memory 42. The fourth, and higher, actuator strokes $A9_M$ may then be subsequently calculated using the stored differential trigonometric functions, i.e. sine, of the several angular location differences as the pitch and yaw commands $\theta_{PIT}$ and $\theta_{YAW}$ change and are recalculated in eq. (1).

Accordingly, eq. (1) may be used generically regardless of circumferential location of the individual secondary actuators 30 to calculate the required strokes thereof for sliding and tilting the secondary ring 28 for in turn positioning the secondary flaps 20 for vectoring thrust and controlling the outlet area A9 and area ratio A9/A8. And, eq. (2) may be used to verify the stroke of each additional secondary 30 actuator greater than the minimum number of three for maintaining single plane translation and tilting of the secondary ring 28.

However, since the secondary ring 28 is joined through the outer links 26 to the respective secondary flaps 20 as illustrated in FIG. 2, suitable correlation of the translation and tilting of the secondary ring 28 with respect to vectoring of the secondary flaps 20 in the exhaust nozzle 10 is required.

As illustrated in FIG. 5, the control method further includes specifying nozzle commands including nozzle pitch and nozzle yaw for vectoring the nozzle 10, and also specifying the required throat area A8 and area ratio A9/A8 of the outlet 24 to the throat 22. The nozzle commands are then suitably converted in the controller 40 to corresponding ring commands including ring pitch, ring yaw, and ring slide to position the secondary ring 28, and in turn the outer links 26 and secondary flaps 20 in response thereto.

This may be accomplished by applying predetermined schedules 46, 48 representing empirical data for converting the nozzle commands to obtain the ring commands, and using additional calculations. These additional calculations are represented by the following equations:

$$\phi_{TILT} = \arccos(\text{Cos}\theta_{PIT} \times \text{Cos}\theta_{YAW}) \quad (3)$$

$$\phi_{TILT} = ((\theta_{PIT})^2 \times (\theta_{YAW})^2)^{1/2} \quad (4)$$

$$\phi_{TILT} = ((\theta_{PIT})^2 - k \times (\theta_{PIT})^2 \times (\theta_{YAW})^2)^{1/2} \quad (5)$$

Eq. (3) is an exact equation used for combining the nozzle or aerodynamic pitch and yaw commands $\phi_{PIT}$ and $\phi_{YAW}$ for obtaining the geometric combination thereof. In order to reduce computational time in the controller 40, eq. (3) may be represented by a first approximation in eq. (4) for angular values less than 25°. And, a second approximation also for angles less than 25° is represented by eq. (5) which includes a constant k having a value of 0.335 in an exemplary embodiment. The total vector tilt angle $\phi_{TILT}$ may then be calculated using the nozzle pitch and yaw commands, with the resulting vector command $\phi_{VEC}$ or VECTOR being provided to both schedules 46,48.

The first schedule 46 includes empirical data based on the vector command, the throat area command, and area ratio command for the nozzle from which the required axial slide of the several secondary actuators is determined. The first schedule also provides a tilt command to the second schedule 48 which also receives the vector command and the original nozzle pitch and yaw commands.

The second schedule 48 includes empirical data for determining the required yaw and pitch commands for the secondary ring 28 which are provided along with the slide command from the first schedule 46 to eq. (1) in the controller from which a required stroke $A9_M$ for each of the secondary actuators 30 is calculated. The stroke for the fourth and higher actuators can be verified using calculations in accordance with eq. (2). The required actuator strokes are then provided to the hydraulic controller 44 which drives the respective output rods 30a and feedback closed loops for properly positioning the secondary ring 28 for positioning the secondary flaps for the command position thereof.

As shown in FIGS. 4 and 5, the individual secondary actuators 30 are disposed in feedback closed loops with the controller 40. As shown schematically in FIG. 5, each secondary actuator 30 includes a detector 50 for measuring stroke of each of the secondary actuators 30 for feedback to the controller 40. The detector 50 may take any conventional form such as a Linear Variable Differential Transformer (LVDT) which produces an electrical signal linearly corresponding with extension or retraction of the actuator output rod 30a representing the measured stroke $A9_M$ thereof. The measured stroke is then compared in the controller 40 in a conventional feedback loop to minimize differences between the calculated or command stroke and the actually measured stroke of the actuators, which difference is driven to a zero or minimum value.

From the so measured strokes, calculations may be performed to obtain slide, pitch, and yaw of the secondary ring 28 based on the initial angular locations $\phi_M$ of the secondary actuators 30. The calculated slide, pitch, and yaw from the measured strokes are functions of trigonometric functions of angular differences between each of the basic three joint angular locations $\theta_M$ and each other in accordance with the following three equations:

$$A9_{Slide} = \frac{A9_1 \text{Sin}(\theta_5 - \theta_3) + A9_3 \text{Sin}(\theta_1 - \theta_5) + A9_5 \text{Sin}(\theta_3 - \theta_1)}{\text{Sin}(\theta_5 - \theta_3) + \text{Sin}(\theta_1 - \theta_5) + \text{Sin}(\theta_3 - \theta_1)} \quad (6)$$

$$\theta_{PIT} = \arcsin \frac{\begin{array}{l}A9_1(\text{Sin}\theta_3 - \text{Sin}\theta_5) + \\ A9_3(\text{Sin}\theta_5 - \text{Sin}\theta_1) + A9_5(\text{Sin}\theta_1 - \text{Sin}\theta_3)\end{array}}{R(\text{Sin}(\theta_5 - \theta_3) + \text{Sin}(\theta_1 - \theta_5) + \text{Sin}(\theta_3 - \theta_1))} \quad (7)$$

$$\theta_{YAW} = \arcsin \frac{A9_1(\cos\theta_5 - \cos\theta_3) + A9_3(\cos\theta_1 - \cos\theta_5) + A9_5(\cos\theta_3 - \cos\theta_1)}{R(\sin(\theta_5 - \theta_3) + \sin(\theta_1 - \theta_5) + \sin(\theta_3 - \theta_1))} \quad (8)$$

As equations (6)–(8) indicate, the angular locations $\theta_{1,3,5}$ for the three secondary actuators 30 in the first redundant system are constant values along with the radius R of the secondary ring 28, with the only variables in equations (6)–(8) being the measured strokes $A9_{1,3,5}$ obtained from the respective detectors 50. In addition to these feedback values of slide, pitch, and yaw of the secondary ring 28, total tilt of the secondary ring may also be calculated using eq. (5) introduced above.

As indicated above, the trigonometric functions, i.e. sine and cosine, of the angular locations $\theta_M$ may be calculated once and stored in memory. And, the trigonometric functions of the differential angular locations found in equations (6)–(8) may also be calculated once and stored in the memory 42 to prevent the recalculation thereof during real time processing. Initially, the trigonometric functions of the angular differences are calculated and stored in memory for subsequent reuse in the various equations as required to reduce computational requirements of the controller 40 and increase processing speed.

As shown in FIG. 5, the feedback loop thusly allows calculation of pitch, yaw, tilt and slide of the secondary ring 28 from the measured strokes thereof. These values in turn are provided to the first and second schedules 46, 48 along with the initial command throat area A8 for determining the pitch, yaw, and area ratio A9/A8 for the nozzle.

These calculated data are then used for two important purposes in controlling the aircraft. Firstly, these data are transmitted back to the aircraft flight controller, and are used therein along with calculated engine thrust to determine the response needed both from the aircraft control surfaces and from the vectoring engine nozzle. Secondly, these data are used for nozzle mechanical and load limiting logic in the nozzle controller 40.

The improved control system 38 and method of operation described above may be used in existing thrust vectoring nozzles without structural changes. The corresponding circumferential locations of the respective secondary actuators are suitably determined and input into the controller 40 for initial calibration and subsequent nozzle control. The control algorithms in the nozzle controller 40 are therefore made independent of the actuator circumferential location, independent of hydraulic actuation systems, and independent of the number of secondary actuators in each hydraulic system, with a minimum of three actuators therefor. The vectoring nozzle may then be initially calibrated for substantial reductions of time, operator intervention, and hardware damage potential.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A method for controlling stroke of three circumferentially spaced apart actuators attached at respective joints to an actuation ring in a gas turbine engine exhaust nozzle comprising:

specifying circumferential angular location of each of said actuator joints;

independently calculating stroke for each of said actuators using said joint locations in response to pitch and yaw commands; and operating said actuators to effect said respective strokes therefor to position said nozzle.

2. A method according to claim 1 wherein:

said stroke includes components for common axial slide, pitch, and yaw of said ring; and said pitch and yaw components include trigonometric functions of said angular locations.

3. A method according to claim 2 further comprising:

specifying said angular locations at least once;

calculating said trigonometric functions of said angular locations;

storing in memory said calculated trigonometric functions of said angular locations; and using said stored trigonometric functions in subsequently calculating said stroke as said pitch and yaw commands change.

4. A method according to claim 3 wherein said actuator stroke is a summation of:

said axial slide;

product of sine of said pitch command and cosine of said joint angular location times a radius from a centerline of said ring; and product of sine of said yaw command and sine of said joint angular location times said ring radius.

5. A method according to claim 3 wherein said exhaust nozzle includes a fourth actuator attached at a fourth joint to said actuation ring circumferentially between a pair of said three actuators, and further comprising:

specifying circumferential angular location of said fourth joint;

calculating stroke for said fourth actuator in response to said pitch and yaw commands;

measuring stroke for each of said actuators; and re-calculating stroke for said fourth actuator as a function of said measured strokes for said three actuators to verify displacement of said ring in a common plane.

6. A method according to claim 5 wherein said recalculated fourth actuator stroke is a function of angular differences between each of said four joint angular locations and each other.

7. A method according to claim 6 wherein:

said fourth actuator stroke includes differential trigonometric functions of said angular differences;

said differential trigonometric functions thereof are calculated and stored in said memory; and said fourth actuator stroke is subsequently calculated using said stored differentials functions as said pitch and yaw commands change.

8. A method according to claim 3 wherein:

said exhaust nozzle further includes secondary exhaust flaps joined at aft ends to corresponding outer links in turn joined to said actuation ring;

primary exhaust flaps, and joined at aft ends to forward ends of said secondary flaps defining a throat having a flow area diverging to a nozzle outlet having a flow area; and further comprising specifying nozzle commands including nozzle pitch and yaw for vectoring said nozzle, and said throat area and area ratio of said outlet to said throat; and converting said nozzle commands to ring commands including said ring pitch, yaw, and slide to position said ring and in turn said outer links and secondary flaps in response thereto.

9. A method according to claim 8 further comprising applying predetermined schedules to said nozzle commands to obtain said ring commands.

10. A method according to claim 3 further comprising:

measuring stroke of each of said actuators; and controlling actuator stroke in feedback closed loops to minimize differences between said calculated and measured strokes of said actuators.

11. A method according to claim 10 comprising calculating said ring slide, pitch, and yaw from said measured strokes, and from said angular locations of said actuators.

12. A method according to claim 11 wherein:

said calculated ring slide, pitch, and yaw are functions of trigonometric functions of angular differences between each of said three joint angular locations and each other; and said trigonometric functions of said angular differences are calculated and stored in memory for subsequent use.

13. A control system for controlling stroke of three circumferentially spaced apart actuators attached at respective joints to an actuation ring positionable to vector thrust in a gas turbine engine exhaust nozzle comprising:

means for specifying circumferential angular location of each of said actuator joints;

means for independently calculating stroke for each of said actuators using said joint locations in response to pitch and yaw command; and means for operating said actuators to effect said respective strokes therefor to position said nozzle.

14. A system according to claim 13 wherein:

said specifying means include a digital memory;

said calculating means include a digital programmable controller; and said operating means include a hydraulic controller operatively joined to each of said actuators for selectively extending and retracting respective output rods thereof.

15. A system according to claim 14 wherein:

said stroke includes components for common axial slide, pitch, and yaw of said ring; and said pitch and yaw components include trigonometric functions of said angular locations.

16. A system according to claim 15 wherein said memory includes stored values of said trigonometric functions of said joint angular locations.

17. A method for controlling stroke of three circumferentially spaced apart actuators operably joined to a controller and attached at respective joints to an actuation ring in a gas turbine engine exhaust nozzle comprising:

specifying in said controller circumferential angular location of each of said actuator joints;

calculating trigonometric functions of said angular locations;

independently calculating stroke in said controller for each of said actuators using said calculated trigonometric functions in response to pitch and yaw commands; and operating said actuators to effect said respective strokes therefor to position said nozzle.

18. A method according to claim 17 wherein:

said stroke includes calculated components for common axial slide, pitch, and yaw of said ring; and said pitch and yaw components include said calculated trigonometric functions of said angular locations.

19. A method according to claim 18 further comprising:

specifying said angular locations only once;

calculating in said controller said trigonometric functions of said angular locations;

storing in memory said calculated trigonometric functions of said angular locations; and using said stored trigonometric functions in subsequently calculating said stroke as said pitch and yaw commands change.

20. A method for controlling stroke of three circumferentially spaced apart actuators attached at respective joints to an actuation ring in a gas turbine engine exhaust nozzle comprising:

defining generically a stroke equation including pitch and yaw components based on circumferential angular location of said actuator joints;

specifying said circumferential angular locations of each of said actuator joints;

calculating trigonometric functions of said angular locations for said equation to obtain corresponding constants therefor;

independently calculating stroke for each of said actuators using said equation and constants in response to pitch and yaw commands; and operating said actuators to effect said respective strokes there for to position said nozzle.

21. A method for controlling stroke of three circumferentially spaced apart actuator attached at respective joints to an actuation ring in a gas turbine engine exhaust nozzle comprising:

specifying circumferential angular location of each of said actuator joints in a generic stroke equation including pitch and yaw components based thereon;

calculating trigonometric functions of said circumferential angular locations for use in said equation;

calculating stroke from said equation for each of said actuators using said pre-calculated trigonometric functions; and operating said actuators to effect said respective calculated strokes therefor to position said nozzle.

22. A method according to claim 21 wherein said stroke equation includes axial translation, and pitch and yaw based on said pre-calculated trigonometric functions.

* * * * *